United States Patent [19]

Osborn

[11] Patent Number: 5,167,308
[45] Date of Patent: * Dec. 1, 1992

[54] COMBINATION BRAKE/PARK LOCKOUT AND STEERING MECHANISM AND SYSTEM

[75] Inventor: Charles Osborn, Spring Lake, Mich.

[73] Assignee: Grand Haven Stamped Products, Div. of JSJ Corporation, Grand Haven, Mich.

[*] Notice: The portion of the term of this patent subsequent to Mar. 17, 2009 has been disclaimed.

[21] Appl. No.: 802,138

[22] Filed: Dec. 3, 1991

Related U.S. Application Data

[63] Continuation of Ser. No. 642,477, Jan. 17, 1991, Pat. No. 5,096,033.

[51] Int. Cl.$^5$ .............................................. B60K 41/28
[52] U.S. Cl. .................................... 192/4 A; 74/878
[58] Field of Search ......................... 192/4 A; 74/878

[56] References Cited

U.S. PATENT DOCUMENTS

| | | | |
|---|---|---|---|
| 2,437,406 | 3/1948 | Rogers | 335/255 X |
| 3,710,904 | 1/1973 | Boyer et al. | 192/4 A |
| 3,859,828 | 1/1975 | Ibuka et al. | 70/252 |
| 3,942,614 | 3/1976 | Thompson | 192/4 A |
| 4,096,930 | 6/1978 | Viscardi | 192/4 A |
| 4,126,054 | 10/1978 | Langford et al. | 74/473 R |
| 4,187,935 | 2/1980 | O'Hern | 192/4 A |
| 4,235,123 | 11/1980 | Simancik et al. | 74/475 |
| 4,255,984 | 3/1981 | Abels et al. | 74/474 |
| 4,296,688 | 5/1981 | Murasaki | 74/527 |
| 4,296,847 | 10/1981 | Arndt | 192/4 A |
| 4,301,692 | 10/1981 | Frazee | 74/476 |
| 4,473,141 | 9/1984 | Mochida | 192/304 X |
| 4,474,085 | 10/1984 | DeVogelaere et al. | 74/878 |
| 4,513,276 | 4/1985 | Kubota et al. | 340/52 R |
| 4,520,640 | 6/1985 | Kramer | 70/248 |
| 4,532,824 | 8/1985 | Lamy et al. | 74/475 |
| 4,572,340 | 2/1986 | Pierce | 192/4 C |
| 4,645,046 | 2/1987 | Takano et al. | 192/4 A |
| 4,660,443 | 4/1987 | Simancik | 74/878 |

(List continued on next page.)

FOREIGN PATENT DOCUMENTS

| | | |
|---|---|---|
| 50-54733 | 4/1975 | Japan . |
| 53-45573 | 12/1978 | Japan . |
| 56-19451 | 6/1981 | Japan . |
| 57-42424 | 3/1982 | Japan . |
| 57-148222 | 9/1982 | Japan . |
| 57-163427 | 10/1982 | Japan . |

(List continued on next page.)

Primary Examiner—Leslie A. Braun
Assistant Examiner—Nicholas Whitelaw
Attorney, Agent, or Firm—Price, Heneveld, Cooper, DeWitt & Litton

[57] ABSTRACT

A locking mechanism and system for a vehicle shifter in which the shifting lever is locked in a park lock position until the brakes of the automotive vehicle are applied and/or the steering lockout mechanism located in the steering column of the vehicle is released by the ignition key of the vehicle. In one embodiment of the invention the pawl of the shifting lever is restrained by a lockout arm through which the brake mechanism and the lockout cable extending to the steering column are connected. In another embodiment, the lockout cable is eliminated by providing two electrical control modules operatively connected to the brake mechanism and the ignition key switch which controls the steering lockout mechanism. These two modules are connected in a unique circuit so that the shifting lever cannot be shifted out of park to other gear positions until the brake is applied and the steering lockout mechanism is released by the ignition key switch. This system prevents the return of the ignition switch to the lock position until the shifting lever is in the park position. In other embodiments of this invention, a manual apparatus is provided for retracting the lock pin of a control module to unlocked position. In still another embodiment, a structure is provided for overriding the extension of the lockout pin of a control module by exerting a greater than normal force on the shifting lever.

10 Claims, 8 Drawing Sheets

U.S. PATENT DOCUMENTS

| | | | |
|---|---|---|---|
| 4,724,722 | 2/1988 | Beauch et al. | 74/850 |
| 4,768,610 | 9/1988 | Pagel et al. | 180/271 |
| 4,887,702 | 12/1989 | Ratke et al. | 192/4 A |
| 4,905,802 | 3/1990 | Gotoh | 192/4 A |
| 4,909,096 | 3/1990 | Kobayashi | 74/538 |
| 4,919,202 | 4/1990 | Muramatsu | 192/4 A |
| 4,930,609 | 6/1990 | Bois et al. | 192/4 A |
| 4,932,493 | 6/1990 | Sakurai et al. | 180/271 X |
| 4,936,158 | 6/1990 | Livshits et al. | 74/475 |
| 4,938,042 | 7/1990 | Muramatsu | 70/245 |
| 4,947,967 | 8/1990 | Kito et al. | 192/4 A |
| 4,947,968 | 8/1990 | Slavin et al. | 192/4 A |
| 4,955,935 | 9/1990 | Katayama | 192/4 A X |
| 4,966,262 | 10/1990 | Mieczkowski | 192/4 A |
| 4,967,883 | 11/1990 | Kito et al. | 192/4 A |
| 4,976,171 | 12/1990 | Sharp et al. | 74/878 |
| 4,981,048 | 11/1991 | Kubayashi et al. | 192/4 A X |
| 4,986,399 | 1/1991 | Gokee | 192/4 A |
| 4,991,700 | 2/1991 | Koga | 192/4 A |
| 5,003,799 | 4/1991 | Imai et al. | 192/4 A X |
| 5,027,929 | 7/1991 | Ratke et al. | 192/4 A |
| 5,058,462 | 10/1991 | Killiany et al. | 192/4 A X |
| 5,062,509 | 11/1991 | Carpenter et al. | 192/4 A |
| 5,096,033 | 3/1992 | Osborn | 192/4 A |

FOREIGN PATENT DOCUMENTS

| | | |
|---|---|---|
| 59-137234A | 8/1984 | Japan . |
| 59-17653 | 11/1984 | Japan . |
| 60-20447 | 2/1985 | Japan . |
| 60-20448 | 2/1985 | Japan . |
| 60-23427 | 2/1985 | Japan . |
| 60-135352 | 7/1985 | Japan . |
| 61-143825A | 7/1986 | Japan . |
| 62-20343 | 5/1987 | Japan . |
| 2089450A | 6/1982 | United Kingdom . |
| 90/09904 | 9/1990 | World Int. Prop. O. . |

COMBINATION BRAKE/PARK LOCKOUT AND STEERING MECHANISM AND SYSTEM

This is a continuation application of application Ser. No. 07/642,477 filed Jan. 17, 1991 U.S. Pat. No. 5,096,033.

This invention relates generally to a locking mechanism and system for controlling the shifting of a lever for an automotive transmission, and more particularly for such locking mechanism for locking the shift lever in a park position against rotation to other gear positions. More specifically, this invention relates to a locking mechanism which is responsive to the application of the brakes of the automotive vehicle and/or to a steering lockout mechanism located in the steering column of a vehicle controlled by the ignition key of the vehicle.

BACKGROUND OF THE INVENTION

In vehicles which are equipped with automatic transmissions, the shifting lever is movable from a park position to other gear positions such as reverse, neutral, drive, second gear and first gear. The shifting lever is generally associated with a detent plate and detent pawl for releasably holding the lever in the park position and an actuator means is provided for actuating the pawl to release the shifting lever for movement to the other gear positions.

In shifting from the park position to the other gear positions, problems have been encountered in the unintended acceleration of the vehicle and, therefore, efforts have been made to prevent the shifting of the shifting lever until the brake pedal had been depressed so that the vehicle will not move before it is intended by the driver.

Further, presently there is in existence steering lockout mechanisms located in the steering column of the vehicle which prevents the shifting lever from being shifted until the steering mechanism is out of lock. In other words, such steering lockout mechanisms prevents the premature acceleration of the vehicle while the steering mechanism is locked. This has been accomplished by a cable extending from the steering lockout mechanism located in the steering column to the transmission shifter. The cable prevents the shifter from being actuated out of the park position until the steering lockout mechanism is released.

The efforts thus far made in developing brake/park lock mechanisms that will prevent the shifting of the shifter lever until such time as the brake is applied have been very complicated, particularly in those transmission shifters in which a detent plate and detent pawl are associated with the shifting lever for releasably holding the lever in the park position. Also, in this type of shifting lever, the mechanism for locking the shifting lever in a park lock position until the brake is applied and before the steering lockout mechanism is released have been very complicated.

The object of the present invention is to provide a simplified, lower cost version of a brake/park mechanism for preventing a driver from shifting a shifter lever from park position to another gear position unless the brake is applied. Another object is to provide a combination brake/park lock mechanism and steering lock mechanism which will permit the shifter lever to be shifted out of the park position only when the brake is applied and the steering lock mechanism is released by actuation of the ignition key.

SUMMARY OF THE INVENTION

The above objects of locking the shifting lever in the park position unless the brake is applied is achieved by providing an electrically operated control module mounted on the detent plate and having a pin movable between a distended position to an extended position. This control module is controlled by the application or non-application of the brakes of the vehicle in which the shifter is mounted. When the brakes are not applied, the pin is urged to an extended position. A movable lockout arm is provided adapted to be moved when the pawl is actuated by an actuating means mounted in the shifting lever. The pin of the control module when in extended position prevents the lockout arm from being moved by actuation of the pawl actuator and, accordingly, the pin when extended prevents the shifting of the shifting lever since it cannot be moved out of the park position by reason of the pawl engaging the lockout arm which is prevented from being moved by the pin of the control module. However, when the pin is distended by applying the brakes, it is located out of the path of the lockout arm permitting the actuation of the pawl and the shifting of the shifter lever from park position to the other gear positions.

In one embodiment of my invention which includes the dual feature of preventing the shifting of the lever shifter from park position to another gear position unless the brake is applied and the steering lockout mechanism located in the steering column is released, I provide a bell crank having two arms. One arm is operatively connected to the pawl actuator and the other arm constitutes the brake lockout arm and the connection to the lockout cable of the steering lockout mechanism located in the steering column of the vehicle. In this combination of features, the pawl actuator is prevented from actuating the pawl by means of the pin of the control module blocking the brake lockout means and also by means of an unreleased lockout cable of the steering lockout mechanism. Thus, in this combination in order to permit the pawl actuator to pivot the bell crank, the pin of the control module has to be distended so as to be located out of the path of the lockout arm and also the cable extending from the steering lockout mechanism has to be released. Accordingly, both the brake has to be applied to distend the pin and the ignition key has to be turned to a position in which the steering locking mechanism releases the cable.

In still another modification of my invention, I eliminate the necessity for the lockout cable extending from the steering column to the transmission shifter. In this embodiment, a brake lockout arm is provided along with the control module which includes the pin that controls the locked or unlocked condition of the lockout arm. Further, I provide an electrically operated ignition control module associated with the ignition key mechanism which is movable from a "LOCK" (steering locked) position to a "OFF" and "RUN" positions. In the "LOCK" position, a conventional steering lockout mechanism located in the steering column locks the steering wheel. In accordance with this invention, the ignition control module includes a blocking member actuated into a blocking position when the module is de-energized. In the blocking position, the actuation of the key switch member back to the "LOCK" position is prevented.

In order to assure that the shifting lever cannot be taken out of the park position until both the brake is applied and the steering lockout mechanism is released, I provide the brake control module with a switch located in the circuit of the coil of the ignition control module. When the pin of the brake control module is extended, the switch is actuated to closed position in which position the brake control module is de-energized and the lockout arm is in "PARK" condition. In this "PARK" position with the brake unapplied, the pin of the brake control module causes the pawl to be locked in the "PARK" position and the coil of the ignition control module is energized withdrawing the blocking member and permitting the key switch member to be moved to the lock position.

A relay having a coil is provided, the coil being located in the circuit of the brake light switch so that when the brake is applied, the relay is energized to close a circuit to the coil of the brake control module. Obviously, an equivalent solid state "AND" circuit can be utilized in lieu of the relay or other equivalent circuit. This opens the switch of the ignition control module de-energizing its coil and causing the blocking member to block the key switch member from being actuated to the "LOCK" position. This position of the pin of the brake control module, the open condition of the switch of the brake control module and the blocking condition of the blocking member of the ignition control module continues so long as the shifting lever is out of the park position since the transaxle position switch no longer provides current to either of the control modules. However, when the operator stops the vehicle, and moves the shifting lever to park, the transaxle position switch is closed providing current through the switch of the brake control module and to the coil of the ignition control module thereby withdrawing the blocking member of the ignition key mechanism and permitting the key switch member to be actuated to "LOCK" position.

Also in accordance with this invention, I provide a mechanism for manually moving the pin of the brake control module to a distended unlocked position. Also, as another alternative, I provide a mechanism for overriding the locked position of the pin by applying greater than normal force on the shifting lever. Thus, in both cases, although the battery of the vehicle may be dead, the pin of the brake control module can be distended to render the lockout arm in an unlocked condition permitting the pawl to move out of the park position to another gear position, such as neutral, so as to permit towing of the vehicle.

Having briefly described the essential features of my invention, the following drawings together with the more detailed description will serve to explain the concepts and principles of the invention.

DESCRIPTION OF THE PREFERRED EMBODIMENTS

Figure 1:
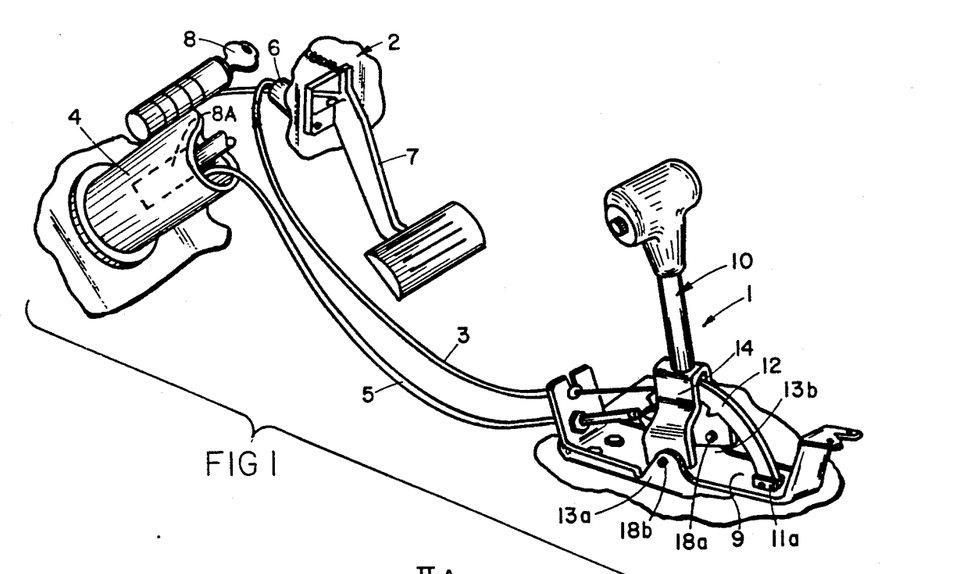
FIG. 1 is a perspective of the vehicle transmission shifter shown in conjunction with an illustration of a steering column and brake.

Referring to the drawings and particularly FIG. 1, reference numeral 1 designates an automatic shifting mechanism for an automotive vehicle operatively connected to a brake mechanism 2 by an electrical cord 3 and to a lockout mechanism located in steering column 4 by lockout cable 5. The brake 2 is adapted by well-known means to actuate a switch 6 for controlling the on/off flow of current through the electrical cord 3 to the shifting mechanism 1. The steering lockout mechanism (not shown) of a common and conventional design and represented by box 8A is located in the steering column 4. Lockout mechanism 8A locks the steering wheel when the ignition key is in "LOCK" position, all of which is conventional and well-known in the art. The lockout cable 5 operatively connected to the steering lockout mechanism, such as the ignition key mechanism 8. Cable 5 extends from the steering column to the shifting mechanism 1. The shifting mechanism 1 is constructed to prevent the shifting of the shifting lever 10 from the park position to other gear positions unless the brake pedal 7 is depressed to actuate the brake switch 6. Further, the shifting mechanism as disclosed in FIGS. 1–9 prohibits the shifting of the shifting lever 10 out of the park position unless the steering lock mechanism which prevents the turning of the steering wheel is released to permit the turning of the wheel.

FIGS. 2, 2A and 3–6 show one embodiment of the shifting mechanism 1 which includes the base 9 having a pair of spaced ears 11a and 11b supporting a detent plate 12 and spaced ears 13a and 13b supporting the shifting lever 10 by means of the U-shaped carrier 14 and pivot pins 18a and 18b. The base 9 also pivotally supports the lockout bell crank 15 on the ear 16 for rotational movement about the pivot pin 17.

Figure 2:
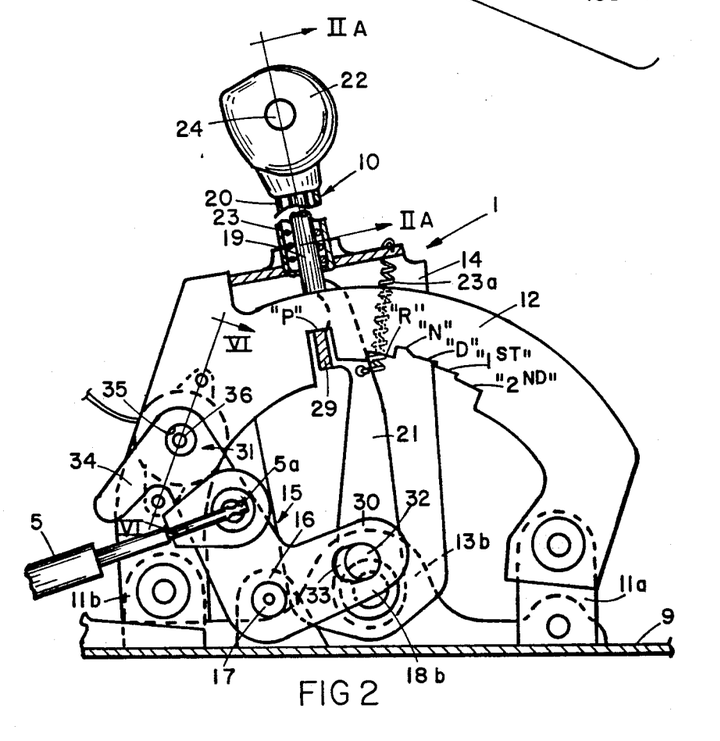
FIG. 2 is a side-elevational view of the shifter of this invention having a portion cut away to best illustrate the parts thereof.
Figures 2A, 3:
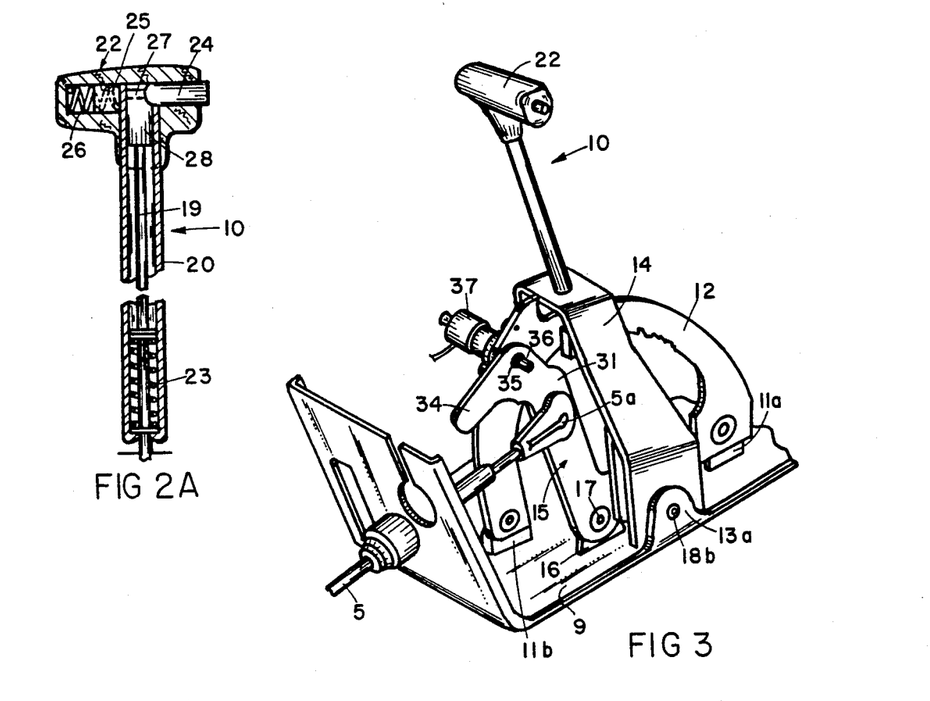
FIG. 2A is a cross-sectional elevational view of the shifter lever taken along the plane IIA—IIA and illustrating one mechanism for actuating the detent pawl of the shifter of this invention.
FIG. 3 is a side-elevational perspective view of the shifter of FIGS. 1 and 2.

Shifting lever 10 as disclosed in FIGS. 1, 2 and 2A is of a conventional type which includes a shaft 19 extending through a tube 20 which is secured to the bight portion of the U Shaped carrier 14. The shaft 19 is slidably mounted in the tube 20 and an actuator arm 21 is secured at its lower end. A handle 22 is secured to the top of the tube 20 and provides a housing for the means for actuating the rod or shaft 19 which is biased upwardly into the housing formed by handle 22 by means of the spring 23 and/or extension spring 23a. The means for actuating rod 19 in a downwardly direction includes the button 24 slidably mounted within the bore 25 and biased outwardly of the bore by means of the spring 26. Button 24 contacts the inclined cam surface 27 of a plunger 28 so that when the button 24 is depressed to overcome the bias of spring 26, the shaft or rod 19 is forced downwardly. A detent pawl 29 is connected to the lower end of the shaft 19 at the juncture of the shaft and the actuating arm 21. Pawl 29 holds the shifting lever 10 in various gear positions as established by the detent plate 12 which will now be described.

Detent plate 12 is an arcuate plate having a series of notches designated by the letters "P", "R", "N", "D", "1ST" and "2ND" which designate "PARK", "REVERSE", "NEUTRAL", "DRIVE", "1ST" and "2ND". Thus, as is well known in the art, shifting the shifting lever 10 to each of the notches will shift the automatic transmission to such gear positions.

The above described detent plate 12 and shifting lever 10 including pawl 29, pushbutton 24 and associated parts are generally well known and conventional. One novel feature of FIGS. 2–5 is the bell crank 15 having two arms 30 and 31, arm 31 providing a lockout means controlled by application of the brakes and release of the lockout steering mechanism.

The actuating arm 21 of the shifting lever 10 is connected to arm 30 of bell crank 15 by means of the pin 32 riding in the elongated slot 33 thus providing a sufficient amount of lost motion when the pawl 29 is depressed by the shaft 19 to pivot the bell crank 15. The other arm 31, as previously stated, provides a lockout arm for preventing the actuation of the pawl 29 unless the brake 7 is depressed and the cable 5 connected to the steering lockout mechanism in the steering column is released.

The means for preventing the driver from shifting the shifter from "PARK" position to another gear position (which means will hereinafter be sometimes referred to as a brake/park lock mechanism), includes the "duck bill" shaped end 34 which has an opening 35 for receiving a pin 36 projecting from electrically operated control module 37, as disclosed in FIGS. 3 and 6. The brake control module (FIG. 6) is comprised of a solenoid 38 electrically connected by the electric cord 3 through the brake switch 6 to the power source of the vehicle. The pin 36 is retracted by the spring 39 to a distended position as represented by the broken lines "A" and is extended against the bias of spring 39 by energization of the solenoid 38 which occurs when the brake 7 is not depressed. When the brake is depressed, the circuit through the solenoid is opened causing pin 36 to be retracted by spring 39.

Figures 6, 7, 8, 9:
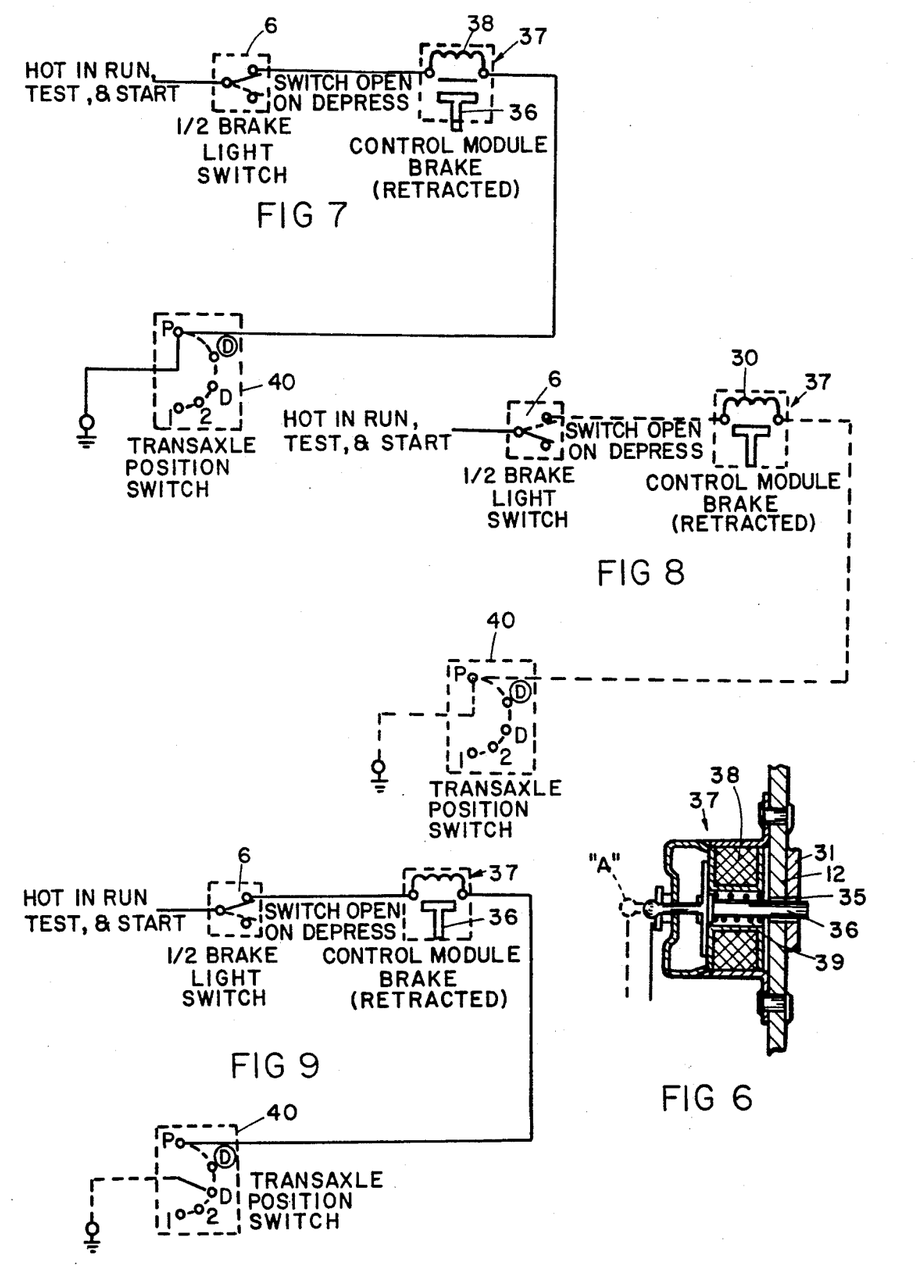
FIG. 6 is a cross-sectional view taken along the plane VI—VI of FIG. 2 showing the electrically operated brake control module of this invention.
FIG. 7 is an electrical schematic of the system of this invention with the shifter lever in park gear position and the brake unapplied.
FIG. 8 the electrical schematic diagram of FIG. 7 illustrating this invention with the shifter lever in park gear position and the brake applied.
FIG. 9 is the electrical schematic diagram of FIG. 7 illustrating this invention in which the shifting gear is in drive gear position with the brake unapplied.

FIGS. 7, 8 and 9 illustrate the operation of the park/brake lock mechanism. These figures disclose a circuit diagram including a brake switch 6, the control module 37 and a well-known transaxle position switch 40 which in most vehicles connects the entire circuit to the electrical power source of the vehicle only when the shifting lever 10 is in "PARK" position. Also, power is supplied to the circuit when in "RUN", "TEST" and "START" positions of the ignition key. It will be readily observed that with the brake switch 6 closed, that is, when the brake is not depressed, solenoid 38 is energized, thereby extending the pin 36 outwardly through the opening 35 of the "duck bill" portion 34 of the arm 31 which will lock the bell crank 15 from being pivoted and, accordingly, will prevent pawl 29 from being depressed out of the park "P" notch. The shifting lever 10 is thereby locked from being shifted out of the "PARK" position to the other gear positions.

FIG. 8 discloses the circuit in which the brake has been depressed opening the brake switch and de-energizing coil 38, as illustrated by the dotted lines of the circuit. In this condition, the spring 39 takes over and moves pin 36 to a distended position out of the opening 35 which makes the brake/park lock mechanism inoperative and permits the shifting of the shifting lever 10, assuming the lockout cable is released by releasing of the steering lockout mechanism located in the steering column.

FIG. 9 discloses the circuit after the shifting lever is shifted to the drive "D" position. In this mode, the circuit is broken by the transaxle position switch 40 and, therefore, the pin 36 is retracted by spring 39 to a distended position.

Figure 4:
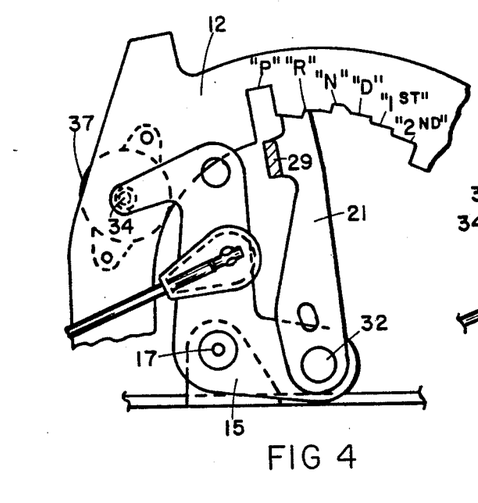
FIG. 4 is a partial side elevational view of the shifter of FIGS. 2 and 3 shown with the pawl depressed.
Figure 5:
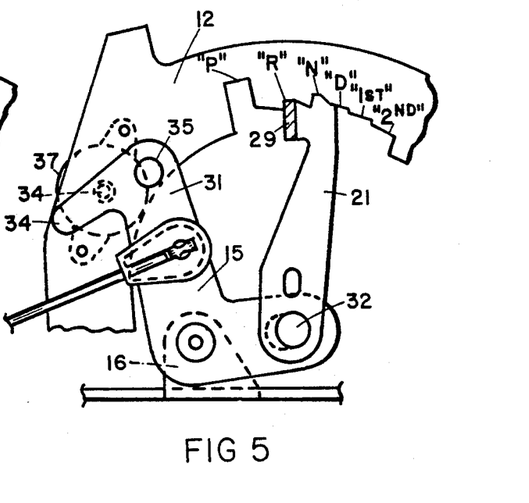
FIG. 5 a partial side-elevational view of the shifter of FIGS. 2 and 3 shown in the neutral gear position.

Although in the example shown, the transaxle position switch 40 opens the circuit as disclosed in FIG. 9, some transaxle switches also close the circuit in the neutral position. As a result, to accommodate those vehicles that have such transaxle switches, I provide a surface on the lockout arm portion in the shape of a duck bill in order to block the pin 36 from being extended by solenoid 38. This feature is illustrated by FIGS. 4 and 5. FIG. 4 discloses the pawl depressed out of the notch "P" which pivots the bell crank 15. As disclosed in FIG. 4, the duck bill portion of the arm 31 extends over the opening 35 and pin 36 to prevent the pin from being extended. This also occurs when the pawl is in a gear position, as illustrated by FIG. 5.

So far, I have described only the operation of the brake/park lock mechanism. This invention also provides for preventing the shifting of the shifting lever out of park position unless the steering lockout mechanism located in the steering column is released. This is accomplished by connecting the conventional lockout cable 5 to the arm 31 of the bell crank 15 by means of connector 5a. The lockout cable 5 thus restrains and prevents the bell crank from being pivoted until such time as the steering lockout mechanism located in the steering column releases the restraining force exerted by the cable on arm 31.

Figure 10:
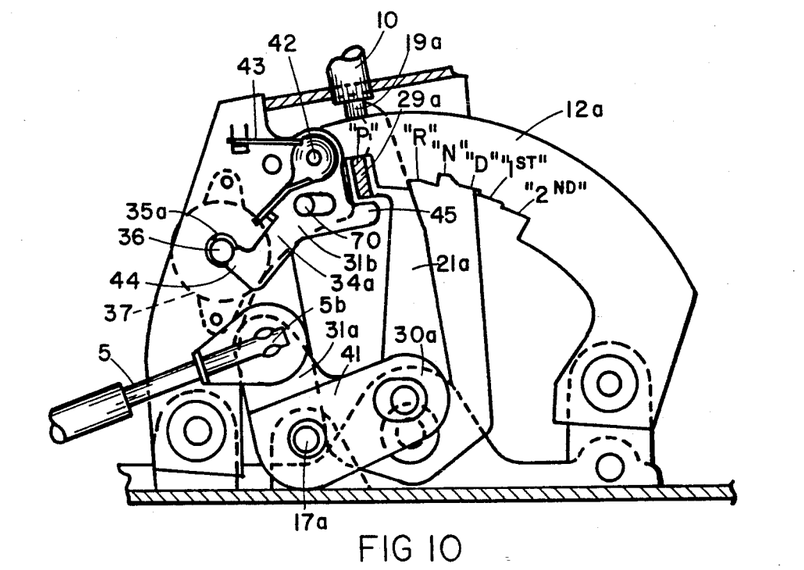
FIG. 10 is a partially cut away side-elevational view of a modified structure of the present invention in which separate lockout arms are provided for the brake/park lockout mechanism and the steering/lockout mechanism.
Figure 11:
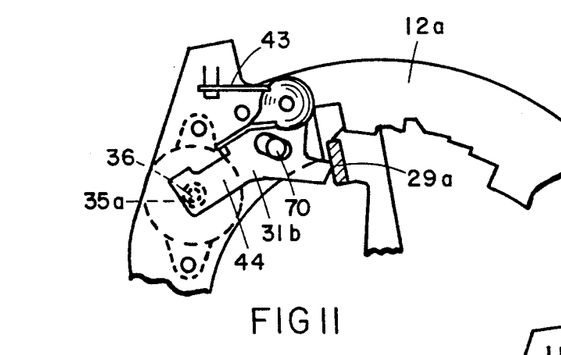
FIG. 11 a partial side-elevational view of the structure shown in FIG. 10 with the pawl depressed and the lockout arm for the brake/park lockout mechanism in unlocked position.
Figure 12:
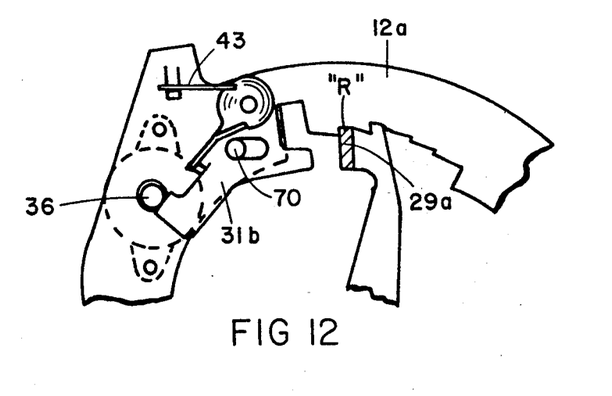
FIG. 12 a partial side-elevational view of the structure of FIG. 10 with the pawl in neutral gear position and the lockout arm for the brake/park lockout mechanism in the rest position.

FIGS. 10, 11 and 12 disclose a modification of the shifting mechanisms of FIGS. 1, 2, 2A and 3-5. The difference lies in providing two separate lockout arms, arm 31b for the brake/park lock mechanism and arm 31a for the cable 5 of steering lockout mechanism. FIG. 10 discloses the bell crank 41 pivotally mounted on the pivot pin 17a and having arm 31a to which the cable 5 is connected by connector 56 and another arm 30a to which is connected the actuator arm 21a of the shifting lever 10. Arm 31b is pivotally mounted on the pivot pin 42 and resiliently held in the position as disclosed in FIG. 10 by the torsion spring 43. Arm 31b is positioned to abut the pin 36 extending outwardly through the opening 35a of the detent plate 12a to which the electrically operated control module 37 is mounted. The detent plate 12a is identical to the detent plate 12 of FIG. 2 so as to include the various notches "R", "N", "D", "1ST" and "2ND". The lockout arm 31b includes an extension 45 which, in the position of FIG. 10, is located in the path of the pawl 29a. It should be evident that with the pin 36 extended through the opening 35a, it is located in the path of the end 44 of arm 31a which prohibits arm 31a from being pivoted by pawl 29a. Thus, the actuation of shaft 19a is prohibited by the pawl 29a striking the extension 45 since the entire arm 31b is restricted by pin 36 from rotating in a clockwise direction. However, when the pin 36 is retracted to a distended position, assuming the cable 5 is released by the steering 30 lockout mechanism in the steering column, the actuation of shaft 19a will depress pawl 29a downwardly out of the notch "P" (the PARK position) permitting the shifting lever 10 to pivot to other gear positions "R", "N", "D", etc.

It should be evident that although the lock arm 31b is rendered in a unlocked condition, the pawl 29a cannot be moved out of the "P" notch unless the cable 5 is released by the steering lockout mechanism located in the steering column. Accordingly, the two arm structure of FIG. 10 accomplishes the same function as the single arm 31 of FIG. described above and, accordingly, operates in the same way as described in relation to the circuit diagram of FIGS. 7, and 9.

An illustration of the operation of the brake/park lock mechanism of FIG. 10 is disclosed in FIGS. 11 and 12. FIG. 11 discloses the pawl 29a having been depressed to rotate lockout arm 31b to a position which permits the pawl to be moved to the various notches in the detent plate 12. It should be obvious from FIG. 11 that the arm 31b includes a surface area 44 which covers the opening 35a to prevent the pin 36 from projecting therethrough in response to the energization of the coil 38 in the same way as the duck bill surface area 34 covers the opening 35 when the pawl 29a of FIG. 2 is depressed.

FIG. 12 discloses the pawl 29a in one of the drive positions, namely, the reverse position "R", in which event the spring 43 has biased the arm 31b to the same position as disclosed in FIG. 10. The biased rotation of arm 31b is stopped by stop pin 70.

FIGS. 13-21 disclose another embodiment of my invention utilized in a system requiring the brake be applied and the steering lockout mechanism in the steering column released before the shifting lever can be moved out of park to other gear positions. In this embodiment, the lockout cable leading from the steering column has been completely eliminated and in lieu thereof two electrically operated control modules are provided, one for the brake/park lock mechanism and the other for the steering lockout mechanism. The two modules are connected in a unique circuit to accomplish the same result as the embodiment previously described.

Figure 13:
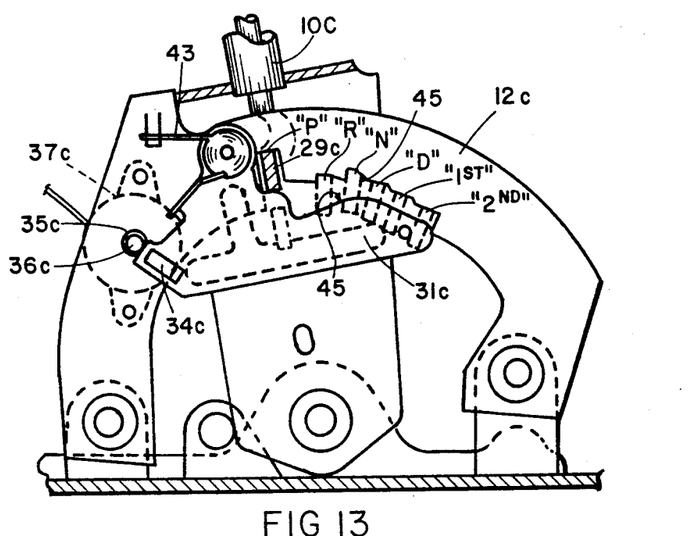
FIG. 13 is another modification of the present invention wherein the lockout cable for the steering lockout mechanism is eliminated, such structure being utilized with a steering lockout mechanism having a key switch member the lockout of which is accomplished by an electrically operated ignition control module, all as disclosed in FIGS. 16–21.
Figure 14:
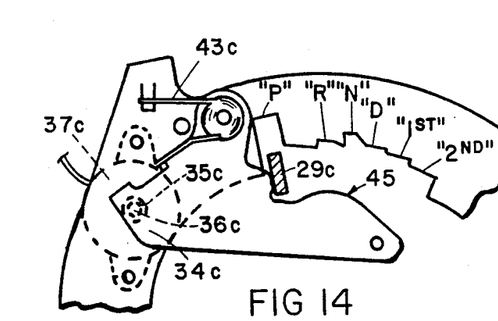
FIG. 14 is a partial side-elevational view of the mechanism of FIG. 13 with the pawl depressed and the lockout arm in unlocked position.
Figure 15:
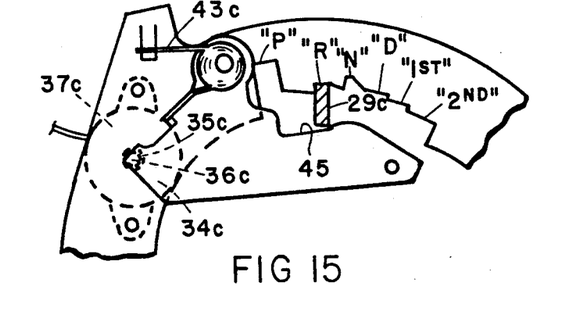
FIG. 15 is a partial side-elevational view of the mechanism of FIG. 13 with the pawl in reverse gear position and the arm in unlocked position.

The mechanical mechanism for the brake/park lock mechanism is disclosed in FIGS. 13, 14 and 15 and is very similar to that of FIGS. 10, 11 and 12. The difference lies in the shape of the lockout arm 31c to assure that in all gear positions of the pawl 29c, except for the "P" (park) position, the arm includes an area which covers the opening 35c so as to prevent the pin 36c from projecting through the opening in extended position. To accomplish this end, the edge 45 of the lockout arm 31c takes the form of a curvilinear shape over which the pawl 29c cams to rotate the lockout arm 31c. Other than this change in the shape of the lockout arm, the structure for the brake/park lock mechanism is essentially the same as that of FIGS. 10, 11 and 12 and, as a result, it includes the shifting lever 10c, the detent plate 12c, the torsion spring 43c and the modified electrically operated control module 37c. FIGS. 14 and 15 illustrate this feature of the portion 34c which covers the opening 35c and pin 36c when the pawl 29c is depressed (FIG. 14) and when the pawl 29c is in one of the other gear positions (FIG. 15). It will be noted that the edge 45, although being curvilinear so as to permit the pawl 29c to slide thereover, approximates the shape of the notched edge of the detent plate 12.

Figure 23:
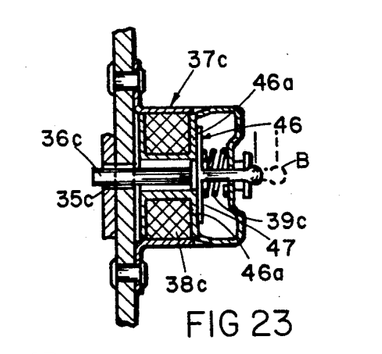
FIG. 23 is a cross-sectional side-elevational view of the brake control module utilized in the system as disclosed in FIGS. 19, 20 and 21.

Although the shape of the electrically operated control module 37c appears to be substantially the same as module 37, previously described in relation to FIG. 6, control module 37c has been modified by adding a switch 46. FIG. 23 discloses module 37c which includes the solenoid 38c, the pin 36c and the switch 46 comprising the switch contacts 46a, 46b adapted to be bridged by contact bar 47 attached to and movable with the pin 36c. The control module 37c is also different from module 37 by biasing pin 36c outwardly to the extended position by means of spring 39c and retracting pin 36c to the distended position (disclosed by the dotted lines B) by the energization of solenoid 38. The reason for reversing the operation of the control module 37c as compared to the control module 37 will be evident upon explanation of the ignition key mechanism of FIGS. 16, 17 and 18 and circuit diagram of FIGS. 19, 20 and 21.

It will be noted that FIGS. 16–21 show a second electrically operated control module 50 which is located at the ignition switch and serves the purpose of locking and preventing the actuation of the key switch member to the "LOCK" position except under certain circumstances. It is this ignition control module 50 connected uniquely in a circuit with control module 37c that permits elimination of lockout cable 5.

Figure 16:
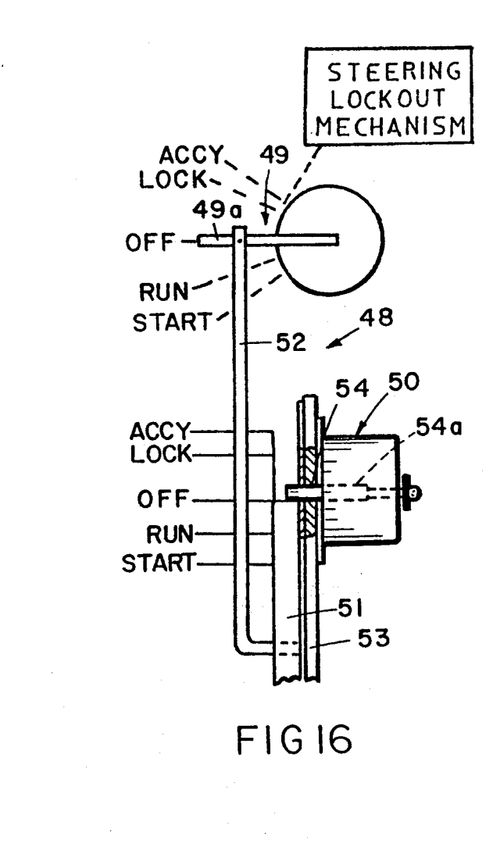
FIGS. 16, 17 and 18 are schematics of a steering lockout mechanism which includes a key switch member, the actuation thereof under certain circumstances being controlled by an ignition control module to block and prevent under such circumstances the actuation of the key switch to the "LOCK" position.
Figure 17:
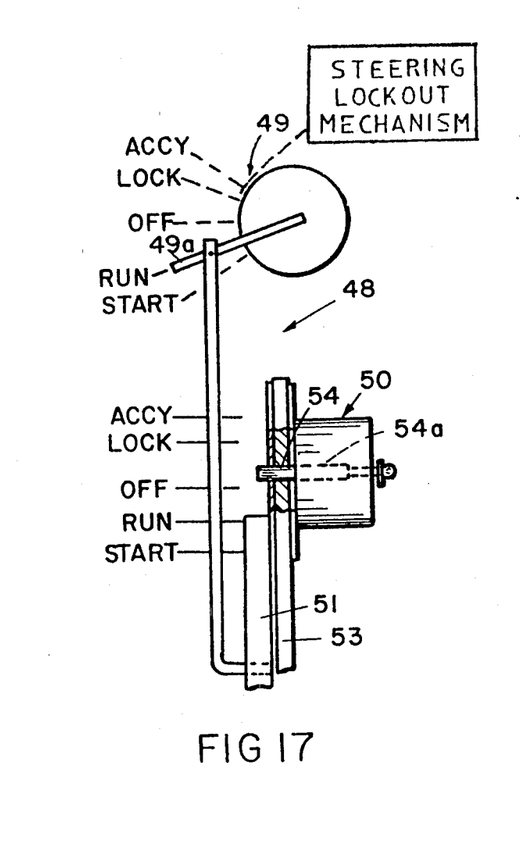
Figure 18:
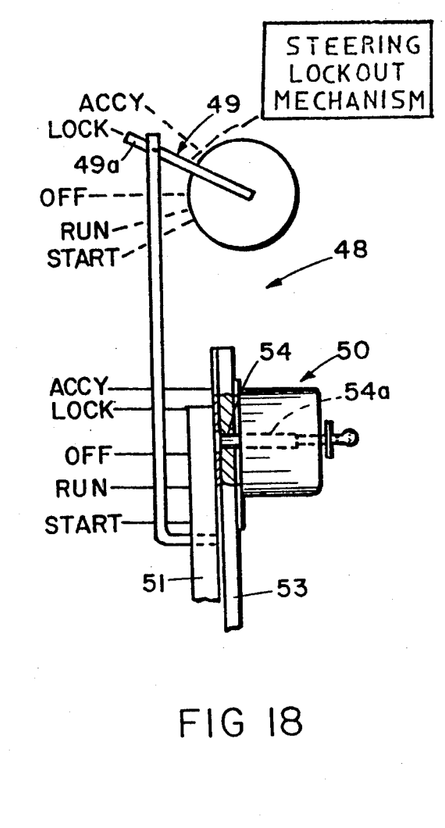

FIGS. 16, 17 and 18 disclose sketches of an ignition key mechanism 48 the position of which controls in a conventional manner the steering lockout mechanism 8A. Specifically, the mechanism 48 includes a key switch 49 which can be turned to five separate positions, namely, an accessory (ACCY) position, a steering locked (LOCK) position, and OFF position, a RUN position and a START position. Ignition key mechanism 48 includes a key switch member 49a which is movable to the above different positions. A blocking member 51 is connected to member 49a by the link 52 so that the blocking member 51 moves with switch member 49 along a support member 53. The support member includes an opening 54 through which a pin 54a extends when the solenoid 56 (FIGS. 19, 20 and 21) of the ignition control module is de-energized. This is accomplished in substantially the same way as the control module of FIG. 23 except that the control module 50 does not include a switch.

FIGS. 16, 17 and 18 disclose the position of the blocking member 51 in each of three positions, that is, OFF, RUN and LOCK. In the LOCK position of FIG. 18, the steering lockout mechanism 8A located in the steering column prevents the steering wheel from being turned. However, when moved out of the LOCK position to the OFF, RUN or START positions, the steering lockout mechanism 8A in the steering column is released permitting the driver to turn the steering wheel. The safety feature of the mechanism in FIGS. 16, 17 and 18 is to prevent the member 49a from being switched to the LOCK position unless the shifter lever 10c is in park "P" position. FIGS. 16 and 17 disclose the condition of the steering lock mechanism when in the OFF and RUN position wherein the pin 55 is extended to prevent the blocking member 51 and consequently the switch member 49 from returning to the lock position unless the shifting lever 10c of FIG. 13 is in the park "P" position.

Figures 19, 20:
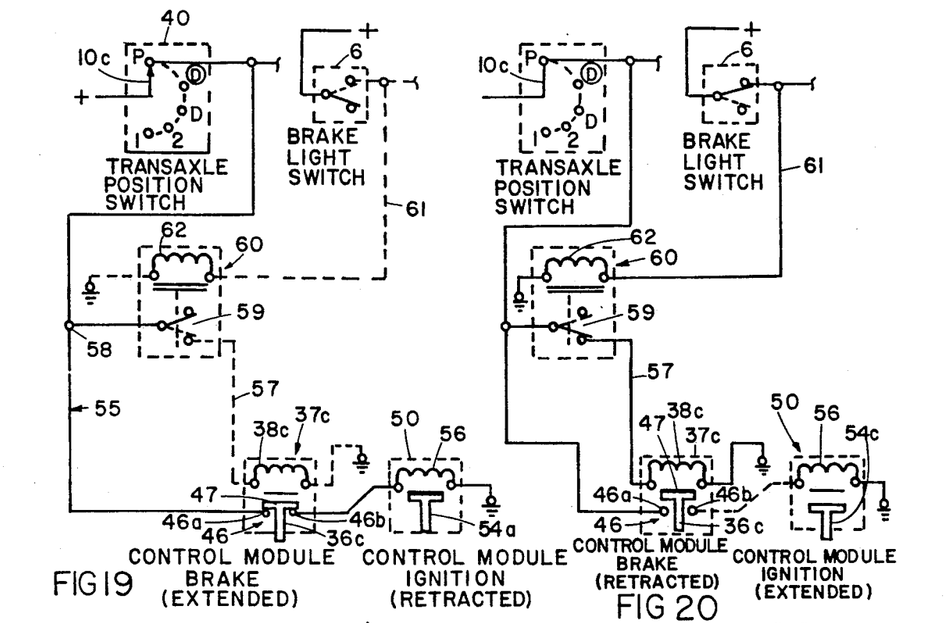
FIG. 19 is an electrical schematic diagram illustrating the current flow and the conditions of the brake/park lockout mechanism and the steering lockout mechanism utilizing the transmission shifter mechanism of FIGS. 13 and 14 and the steering lock mechanism of FIGS. 16–18 and illustrating the positions of the control modules and current flow through the circuit when the shifter lever is in park gear position with the brake unapplied.
FIG. 20 is the electrical schematic diagram of FIG. 19 illustrating the current flow and the various conditions of the brake/park lockout mechanism and the steering lockout mechanism when the shifting lever is in park gear position with the brake applied.
Figures 21, 22:
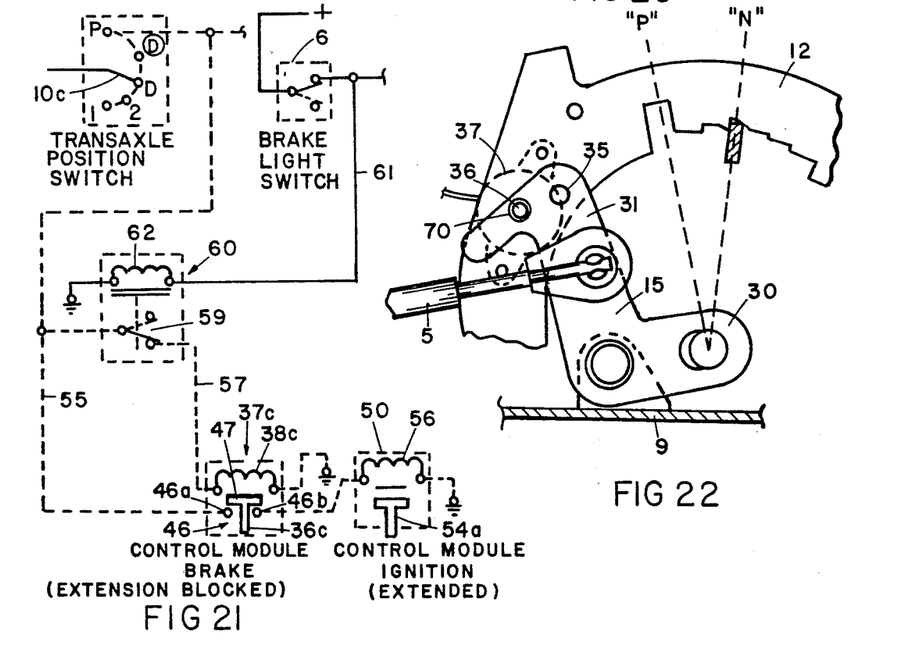
FIG. 21 is the electrical schematic diagram of FIG. 19 illustrating the current flow and conditions of the brake/park lockout mechanism and the steering lockout mechanism when the shifting lever is in drive gear position with the brake applied.
FIG. 22 discloses a modification of the mechanism of FIG. 1 modified to provide in addition to a brake/park lockout feature a brake/neutral lockout feature that prevents shifting of the shifting lever from either "PARK" or "NEUTRAL" position to any other gear position unless the brake is applied.

FIGS. 19, 20 and 21 disclose a circuit diagram in which the brake control module 37c and the ignition control module 50 are interrelated within the circuit to accomplish the above object. Referring to FIGS. 19, 20 and 21, reference numeral 40 designates a transaxle position switch which when switch 49 of the vehicle is turned on is connected into the electrical system of the vehicle and permits the flow of current through the switch when the transmission is in the PARK position as determined by the position of the shifting lever 10c of FIG. 13. The switch of the brake control module comprising the two contact elements 46a and 46b and the contact bar 47, and the solenoid 56 of the ignition control module 50 are located in series with the transaxle position switch 40 to form the circuit 55. A second circuit 57 includes the transaxle position switch 40, the connecting point 58, switch 59 of the relay 60 and the solenoid 38c of the brake control module 37c. It should be understood, an equivalent solid state circuit such as an "AND" circuit can be substituted for the relay 60. In either case, the relay 60 and its equivalent solid state circuit is considered to be a "switch means". A third circuit 61 includes the solenoid 62 of the relay 60 and the brake switch 6, one side of which connected to the power source of the vehicle.

FIG. 19 discloses the condition of the circuits with the shifting lever 10c in the PARK gear position of FIG. 13 and the brake off. In this mode, the circuit 55 is closed through the transaxle position switch, the switch 46 of the brake control module 37c and the solenoid 56 of the ignition control module 50. The closing of circuit 55 causes pin 54a to be withdrawn as disclosed in FIG. 19. In this condition, the switch member 49 can be actuated to any one of the positions of the ignition key mechanism 48. However, the pin 36c of brake module 37c is biased into extended position since both of the circuits 57 and 61 are open. As a result, the lockout arm 31c (FIG. 13) is prevented from being rotated by the pawl 29c since the end of arm 31c engages the pin 36c and, accordingly, the shifting lever 10c cannot be shifted to the other gear positions since the pawl 29c is locked in the notch "P", that is, in the PARK position.

When the brake is applied, the brake switch 6 is closed (FIG. 20) closing the circuit 61 and energizing the solenoid 62 of the relay 60. This causes switch 59 of the relay 60 to close, thereby closing the circuit 57 through the solenoid 38c of the control module 37c which opens the switch 46 and retracts pin 36c. The opening of switch 46 de-energizes solenoid 56 of the ignition control module 50 causing pin 54a to be forced by a spring toward the extended position of the pin 54a. Assuming key switch 49 is in LOCK position as disclosed in FIG. 18, the blocking member 51 is located in the path of the pin 54a which does not restrict the switch member 49 from being switched to "OFF", "RUN", or "START". In the LOCK position, the steering lockout mechanism located in the steering column prevents the operator of the vehicle from turning the wheel. However, turning the key to the "OFF", "RUN", or "START" position, actuates the blocking member 51 to a position out of the path of the pin 54a permitting the spring (not shown) to force the pin outwardly to extend the pin to the positions as shown in FIGS. 16 and 17. In these positions, the pin 54a and blocking member 51 prevent the key switch member 49a from being actuated to the LOCK position. In the condition as disclosed in FIG. 20, the circuits permit the shifting lever 10c to be shifted from PARK to the other gear positions since the pin 36c has been withdrawn and the ignition control module is set to prevent the key switch member to be moved to the locked position.

FIG. 21 discloses the condition of the circuits 55, 57 and 61 after the shifting lever 10c is shifted to one of the other gear positions "R", "N", "D", "1ST" or "2ND". The shifting of the shifting lever to any of these other gear positions opens the transaxle position switch thereby opening both circuits 55 and 57. Circuit 61 is rendered either open or closed, depending upon whether the brake is depressed. However, although closing circuit 61 will close switch 59 of the relay 60 since no power is applied to either circuits 55 or 57, depression of the brakes will have no affect on the locking out mechanism.

Of utmost importance during the driving of the vehicle in any of the other gear positions, is that the pin 36c of the brake control module 37c be prevented from extending through the opening 35c (FIGS. 13, 14 and 15). As previously disclosed, FIGS. 14 and 15 show the position of the arm portion 34c which covers the opening 35c in any one of the other gear positions thus preventing pin 36c from extending outwardly and interfering with the operation of the shifting lever 10.

It should be understood that once the shifting lever 10c is shifted back to the PARK position of FIG. 13, pin 36c is forced outwardly into extended position by the spring 39c (FIG. 23) to once again lock the shifter into the park "P" gear position.

FIRST MODIFICATION

FIG. 22 shows a modification of the mechanism of FIGS. 1-5. In is modification, an additional opening 70 is provided in the "duck bill" portion of the arm 31. This additional opening provides for a lockout in the "N" gear position as well as in the park "P" position. In this modification, all the other elements are the same including the detent plate 12, the bell crank 15 which includes the arms 30 and 31, and the opening 35 provided for locking the shifting lever in the park "P" position.

SECOND MODIFICATION

A second modification is to provide a means for manually releasing the brake/park lock mechanisms and the steering lock mechanism by manually retracting the pins of the control modules 37, 37c and 50. FIGS. 23, 23a, 24, 25 and 26 disclose one such means. These figures disclose such means in relation to the control module 37d, it being understood that the principle can be applied to the control modules 37, 37c and also control module 50.

Figures 24, 24A:
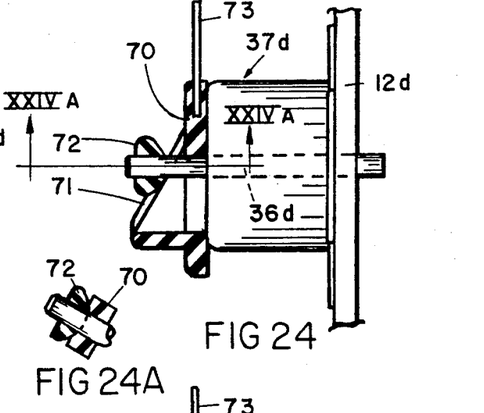
FIG. 24 is a side-elevational view of a modified, manually operable construction of either of the brake control modules and the ignition control module for the brake/park lockout mechanism and the steering lockout mechanism as shown in FIGS. 6, 16–17 or 23.
FIG. 24A is a cross-sectional view taken along the plane XXIVA—XXIVA of FIG. 24.
Figure 25:
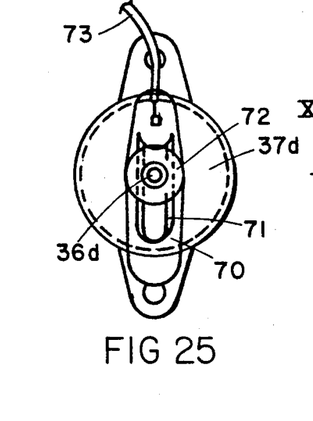
FIG. 25 is a front-elevational view of the control module of FIG. 24.
Figure 26:
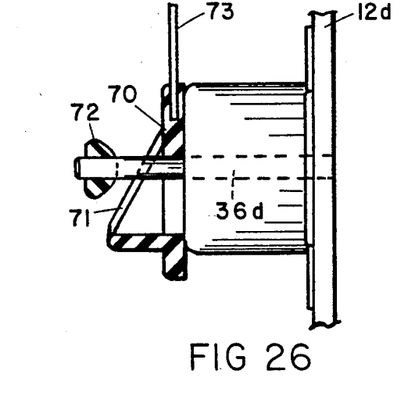
FIG. 26 is a side-elevational view of the control module of FIG. 24 with the pin retracted by a spring or solenoid.

As disclosed in FIGS. 23-25, a reciprocating cam member or wedge 70 is slidably mounted on the back of the module 37d. The cam element 70 has an inclined surface 71 which engages another cam element 72 attached to the rearward end of the pin 36d. A member, such as a cable, rod or narrow plate 73, is secured to the cam member 70. As illustrated in FIG. 26, the pin 36d is retracted to a position as shown, either by a spring (not shown) or the solenoid located inside of the module 37d. In the event there is no power because of a dead battery or some other reason, the pin can be likewise retracted by pulling on the member 73 which slides the cam member 70 upwardly as viewed in FIG. 27 causing the cam surface 71 to cam over the cam surface of the cam element 72 which retracts the pin to distended position as disclosed in FIG. 27.

Figure 27:
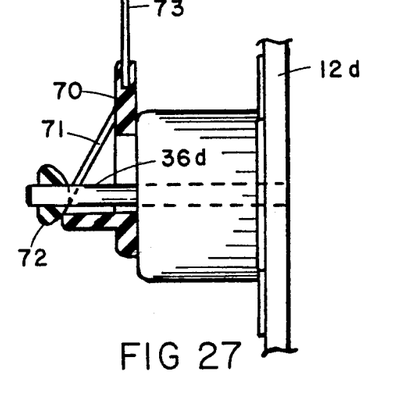
FIG. 27 is a side-elevational view of the control module of FIG. 24 with the pin retracted manually.

In this construction, the wedge 70 may assume any radial position around pin 36d making it possible that the force can be applied from any direction (360°) as disclosed in FIG. 27.

THIRD MODIFICATION

Figure 28:
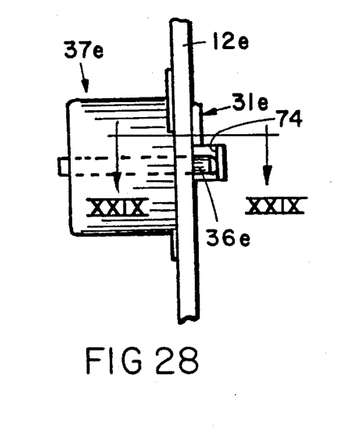
FIG. 28 is a side-elevational view of a modified construction of either of the locking arms and brake control module combinations of FIGS. 10 and 13 illustrating a means for overriding the extended locking position of the module pin by a greater than normal force on the shifting lever.
Figure 29:
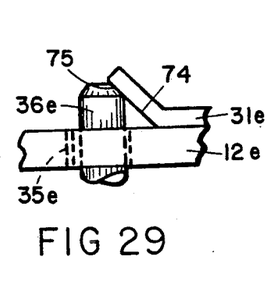
FIG. 29 is an enlarged, cross-sectional, partial view taken along the plane XXIX—XXIX of a portion of the locking arm and brake control module combination of FIG. 28.
Figure 30:
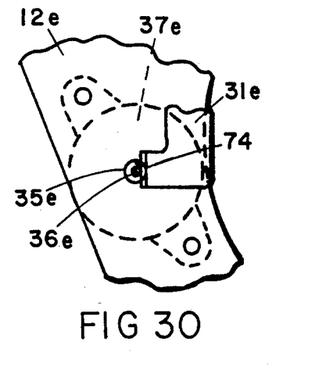
FIG. 30 is a partial, front-elevational view of the locking arm and brake control module combination of FIGS. 28 and 29.

FIGS. 28, 29 and 30 disclose another means for retracting the brake module pins, such as disclosed in FIGS. 10 and 13 by an overriding system, that is, by applying a greater than normal force on the shifting lever. Although this system can be applied to the lockout arm and pin structures of FIGS. 10 and 13, it will be described in relation to lockout arm 31e and pin 36e. As disclosed, lockout arm 31e is formed at its end to provide a cam surface 74, and cam surface 75 is formed on the end of pin 36e. Thus, when a greater than normal force is applied to the shifting lever, pin 36e is forced by lockout arm 31e to the retracted position. The amount of force is determined by the angles of chamfer of the cammed surfaces 74 and 75 and the holding force of the spring or solenoid located in the control module 37e.

From the foregoing description, it may readily be observed by those skilled in the art that the present invention provides a novel lockout mechanism for an automatic shifter wherein the shifter is locked into PARK position unless the brake is applied and the steering lockout mechanism located in the steering column is released. The structure of the invention is relatively low in cost since the parts thereof readily lend themselves to formation as by stamping. Further, the mechanism includes a minimum of parts which are relatively easy to assemble, thereby resulting in cost savings, not only because of the reduced cost of the parts themselves but also in the labor costs. Those skilled in the art will, of course, appreciate the many advantages of the present invention over that shown in the prior art and will also recognize that many modifications can be made without departing from the concept and spirit of the invention. It is, therefore, intended that the equivalent arrangements are to be included as part of this invention except as expressly excluded by the wording of the following claims.

The embodiments of the invention in which an exclusive property or privilege is claimed are defined as follows:

1. A combination brake/park lockout and steering lockout shifter mechanism and system for a vehicle having a shifter lever and a brake comprising:
   said shifter lever being shiftable from a park gear position to at least one drive gear position;
   a transaxle position switch means operatively connected to said shifter lever;
   a brake switch means operably connected to the brake for the vehicle;

a shifter lockout means for locking said shifter lever in locked park position;

an ignition mechanism including a key switch and a lockout switch means for locking and unlocking the steering mechanism for the vehicle, said key switch being movable in a first direction from a "steering locked" to at least one "run" position and in a second direction from "run" position to "steering locked" position;

an electrically operated brake control module for controlling said shifter lockout means, said brake control module in one state preventing the shifting of said shifter lever from park gear to said drive gear position and in another state permitting said shifting of said shifter lever from park gear position to drive gear position;

an electrically operated ignition control module, said ignition control module in one condition having means for permitting the key switch to move in said first direction from a "steering locked" position to a "run" position and in another condition preventing the key switch from moving in said second direction from a "run" position to a "steering locked" position;

a control circuit;

said transaxle position switch and said brake switch being electrically connected to said control circuit;

said brake control module and ignition control module being electrically connected to said control circuit;

said control circuit including switch means for controlling the state of said brake control module and the condition of said ignition control module whereby while said shifter lever is in said locked park position, said ignition control module is in said one condition permitting the key switch to be switched in said first direction to "run" position, and after said key switch is switched to "run" position and said shifter lever is shifted to one of said gear positions as permitted by said shifter lockout means being actuated to unlocked condition, said ignition control module is in said other condition for preventing said key switch from being moved in said second direction from "run" position to "steering locked" position.

2. The combination brake-park lockout and steering lockout mechanism and system of claim 1 in which the control circuit comprises two separate switches, one for each of the brake control module and ignition control module.

3. The combination brake/park lockout and steering lockout mechanism and system of claim 2 in which the opening and closing of the switch for the ignition control module is controlled by the operation of said brake control module.

4. The combination brake/park lockout and steering lockout mechanism and system of claim 2 in which each of the switches include contacts and means operated by solenoids for opening or closing said contacts for controlling the circuit of said ignition control module.

5. The combination brake/park lockout and steering lockout mechanism and system of claim 4 in which the contacts of the switch for the ignition control module are incorporated within said brake control module which includes a solenoid coil; and said means for electrically connecting said contacts within said brake control module is operated by said solenoid coil of said brake control module.

6. A combination brake/park lockout and steering lockout shifter mechanism including a shifter lever movable from a park position to at least one other gear position; a detent plate and detent pawl associated with said shifter lever for releasably holding said shifter lever in said park position; actuator means for actuating said pawl along a given path to release said lever for movement to said other gear position; said shifter mechanism including a combination of a brake/park lockout mechanism and a steering lockout mechanism comprising:

said brake/park lockout mechanism including a lockout arm mounted in the path of the movement of said pawl when said lever is to be moved from park to drive positions; an electrically operated brake control module including an element having a lock position and an unlock position for controlling the lock and unlock condition, respectively, of said lockout arm while said shifter lever is in park position whereby while said shifter lever is in park position and said brake control module is de-energized said lockout arm is in said lock condition and said shifter lever is in locked position and while said shifter lever is in park position and said brake control module is energized said lockout arm is in said unlocked condition and shifter lever is in unlocked condition;

a key switch for controlling said steering lockout mechanism, said key switch including a key switch member being movable from an "off" position to either one of "steering locked" or "run" positions, and an electrically operated ignition control module having a blocking member which during the energized condition of said ignition control module is in an unlocked position and is actuated by de-energization of said ignition control module to a blocking position for blocking and preventing the actuating of said key switch member to said "steering locked" position;

a circuit means for said brake control module and said ignition control module, said circuit means including a brake switch and a transaxle position switch means controlled by the position of said shifter lever;

at least one of said brake switch and transaxle switch being connected to a voltage source for supplying voltage to said circuit;

said circuit means including switch means for controlling the energized and de-energized conditions of said brake control module and ignition control module whereby while said shifter lever is in said locked park position, said blocking member is in non-blocking position permitting the key switch to be moved to "run" position but when said lockout arm of said brake/park lockout mechanism is in unlocked condition and said shifter lever is in one of said other gear positions said blocking member is in blocking position for preventing said key member from being moved to "steering locked" position.

7. The vehicle transmission shift mechanism of claim 6 in which said key switch member is operatively connected to a part which moves along a given path when said key switch member is moved, and said ignition control module includes a solenoid having a coil and an armature operatively connected to said blocking member whereby when said coil is energized said blocking member is extended into the path of said part to block and prevent the actuation of said key switch member to said "steering locked" position.

8. A vehicle transmission shifter mechanism including a shifter lever movable from a park position to at least one other gear position; means associated with said shifter lever for releasably holding said lever in said park position; actuator means for releasing said shifter lever for movement to said other gear position; said shifter mechanism including the combination of a brake/park lockout mechanism and a steering lockout mechanism comprising:

said brake/park lockout mechanism including a lockout means for restricting the movement of said lever from park to drive positions, and an electrically operated brake control means being in an energized or de-energized condition including control means for controlling the lock and unlock conditions, respectively, of said lockout means while said shifter lever is in park position whereby while said shifter lever is in park position and said brake control means is in one of said energized or de-energized conditions, said lockout means is in said lock condition and while said shifter lever is in park position and said brake control means is in the other of said energized or de-energized condition, said lockout means is in said unlocked condition;

a key switch for controlling said steering lock mechanism, said key switch including a key switch member movable from an "off" position to either one of "steering locked" or "run" positions, and an electrically operated ignition control means being in an energized state or a de-energized state and having a coil located in a circuit and having a blocking means actuated by said ignition control means being in one of said energized or de-energized states for blocking and preventing the actuation of said key switch member to said "steering locked" position;

a circuit means for said brake control means and said ignition control means, said circuit means including a brake switch controlled by the actuation and non-actuation of a brake and a transaxle position switch means controlled by the position of said shifter lever;

at least one of said brake switch and transaxle switch being connected to a voltage source for supplying voltage to said circuit;

said circuit means including switch means for controlling the energizing and de-energizing of said brake control means and ignition control means whereby while said shifter lever is in said locked park position and blocking means is in non-blocking condition permitting said key switch means to be moved from "steering locked" position to "run" position but when said lockout means of said brake/park lockout mechanism is in unlocked condition and said shifter lever is in one of said other gear positions said blocking means is in a blocking condition for preventing said key member from being moved to "steering locked" position.

9. The vehicle transmission shift mechanism of claim 8 in which said key switch member is operatively connected to a part which moves along a given path when said key switch member is moved and said ignition control means includes a solenoid having a coil and an armature operatively connected to said blocking means whereby said blocking means causes said part to be blocked to prevent the actuation of said key switch member to said "steering locked" position.

10. A combination brake/park lockout and steering lockout shifter mechanism including a shifter lever movable from a park position to at least one other gear position; means associated with said shifter lever for releasably holding said lever in said park position; actuator means for releasing said shifter lever for movement to said other gear position; said shifter mechanism including the combination of a brake/park lockout mechanism including a lockout means for restricting the movement of said lever from park to drive positions, and an electrically operated brake control means being in an energized or de-energized condition including control means for controlling the lock and unlock conditions, respectively, of said lockout means while said shifter lever is in park position whereby while said shifter lever is in park position and said brake control means is in one of said energized or de-energized conditions, said lockout means is in said lock condition and while said shifter lever is in park position and said brake control means is in the other of said energized or de-energized condition, said lockout means is in said unlocked condition;

a key switch for controlling said steering lock mechanism, said key switch including a key switch member movable from an "off" position to either one of "steering locked" or "run" positions, and an electrically operated ignition control means being in an energized state or a de-energized state and having a coil located in a circuit and having a blocking means actuated by said ignition control means being in one of said energized or de-energized state for blocking and preventing the actuation of said key switch member from "run" position to said "steering locked" position;

switch means for said brake control means and ignition control means for controlling the energization and de-energization of said brake control means and ignition control means, said switch means causing said lockout means to be in locked condition when said brake control means is in one energized or de-energized state and to be in unlocked condition when said brake control means is in the other energized or de-energized state, said switch means causing said blocking means to be in blocking position in one energized or de-energized state of said ignition control means and to be in non-blocking position when said brake control means is in the other energized or de-energized condition;

said switch means including first means for causing said ignition control means to be in said other energized or de-energized state while said shifter lever is in said locked condition whereby said blocking means is in non-blocking condition permitting said key switch member to be moved from "steering locked" to said "run" position;

said switch means also including means to cause said brake control means to be in said other energized or de-energized state thereby causing said lockout means to be in locked condition and permitting said shifter lever to be shifted to one of said other gear positions; and said switch means while said shifter lever is shifted to said one of the other gear positions causing said ignition control means to be in said other energized or de-energized state which causes said blocking means to be in locking position to prevent said actuating of said key switch member from "run" position to said "steering locked" position.

* * * * *

UNITED STATES PATENT AND TRADEMARK OFFICE
CERTIFICATE OF CORRECTION

PATENT NO. : 5,167,308

DATED : December 1, 1992

INVENTOR(S) : Charles Osborn

It is certified that error appears in the above-identified patent and that said Letters Patent is hereby corrected as shown below:

Column 4, line 5:
    After "Fig. 5" insert --is--.

Column 4, line 13:
    After "Fig. 8" insert --is--.

Column 8, line 20:
    After "steering" delete --30--.

Column 8, line 31:
    After "Fig." insert --2--.

Column 8, line 33:
    Before "and 9." insert --8--.

Column 10, line 60:
    After "the" (second occurrence) insert --brake--.

Column 11, line 46:
    "is" should be --this--.

Column 13, claim 1, line 4:
    "switch" should be --steering--.

Column 14, claim 6, line 23:
    After "locked" insert --park--.

UNITED STATES PATENT AND TRADEMARK OFFICE
CERTIFICATE OF CORRECTION

PATENT NO. : 5,167,308

DATED : December 1, 1992

INVENTOR(S) : Charles Osborn

It is certified that error appears in the above-identified patent and that said Letters Patent is hereby corrected as shown below:

Column 16, claim 10, lines 8 and 9:
    After "mechanism" insert --and a steering lockout mechanism comprising:
        said brake/park lockout mechanism--.

Column 16, claim 10, line 30:
    "state" should be --states--.

Signed and Sealed this

Eighteenth Day of January, 1994

*Attest:*

BRUCE LEHMAN

*Attesting Officer*     *Commissioner of Patents and Trademarks*